United States Patent [19]

Levine

[11] E Patent Number: Re. 33,074

[45] **Reissued Date of Patent: * Oct. 3, 1989**

[54] WET-DRY VACUUM CLEANER

[75] Inventor: Morris M. Levine, Scarsdale, N.Y.

[73] Assignee: CIC Int'l Corp., New York, N.Y.

[ * ] Notice: The portion of the term of this patent subsequent to Aug. 27, 2002 has been disclaimed.

[21] Appl. No.: 100,239

[22] Filed: Sep. 23, 1987

Related U.S. Patent Documents

Reissue of:

[64] Patent No.: 4,542,557
Issued: Sep. 24, 1985
Appl. No.: 627,899
Filed: Jul. 5, 1984

U.S. Applications:

[63] Continuation-in-part of Ser. No. 587,227, Mar. 7, 1984, Pat. No. 4,536,914.

[51] Int. Cl.[4] ..... A47L 5/24; A47L 7/00

[52] U.S. Cl. ..... 15/344; 15/347; 15/353

[58] Field of Search ..... 15/320, 321, 344, 347, 15/353

[56] References Cited

U.S. PATENT DOCUMENTS

| | | | |
|---|---|---|---|
| 2,226,630 | 12/1940 | McCord | |
| 2,539,867 | 1/1951 | Schnabel | 15/353 X |
| 3,018,504 | 1/1962 | Hart | 15/353 X |
| 3,079,626 | 3/1963 | Yonkers et al. | 15/353 X |
| 3,267,511 | 8/1966 | Meyerhoefer | 15/353 |
| 3,331,090 | 7/1967 | Reiber et al. | 15/321 |
| 3,605,786 | 9/1971 | Machin | 15/353 X |
| 3,939,527 | 2/1976 | Jones | 15/353 |
| 4,055,405 | 10/1977 | Thun-Hohenstein | 15/353 X |
| 4,142,270 | 3/1979 | Nauta | 15/353 |
| 4,209,875 | 7/1980 | Pugh et al. | 15/344 |
| 4,238,869 | 12/1980 | LaChance | 15/353 |
| 4,341,540 | 7/1982 | Howerin | 15/353 X |
| 4,463,474 | 8/1984 | Jacob | 15/353 |

FOREIGN PATENT DOCUMENTS

| | | | |
|---|---|---|---|
| 1147360 | 4/1963 | German Democratic Rep. | 15/344 |

OTHER PUBLICATIONS

Photograph of Hoover "Pixie" Vacuum Cleaner.

*Primary Examiner*—Chris K. Moore
*Attorney, Agent, or Firm*—Charles E. Baxley

[57] ABSTRACT

A vacuum cleaner for use with both dry and wet operation is formed of a housing which encloses a blower and a motor for driving the blower, the cleaner further including a canister having a nozzle and a storage chamber beneath the nozzle, which canister is removably securable to the front end of the housing. An intake port for air under suction is provided at the front end of the housing, the port having a liquid-deflecting hood extending from an upper portion thereof into the chamber for deflecting any liquid exiting from a posterior port of the nozzle into the chamber. The intake port for the entry of the air under suction is formed within a partition which extends across the housing, the lower portion of the partition serving as a wall which extends upward from the bottom of the housing to the bottom of the intake port to retain liquid, separated from the air stream, within the chamber. An alternative embodiment of the intake port is configured as an inlet chamber having a front wall with a forwardly extending snout, the opening of the snout being positioned above an exit port of the nozzle.

13 Claims, 7 Drawing Sheets

WET-DRY VACUUM CLEANER

Matter enclosed in heavy brackets [ ] appears in the original patent but forms no part of this reissue specification; matter printed in italics indicates the additions made by reissue.

RELATED APPLICATION

This patent application is a continuation-in-part of an original application having Ser. No. 587,227 and a filing date of Mar. 7, 1984, *which is now U.S. Pat. No. 4,536,914, issued Aug. 27, 1985.*

BACKGROUND OF THE INVENTION

This invention relates to portable vacuum cleaners and, more particularly, to a vacuum cleaner capable of operating both with air and liquid cleaners.

Vacuum cleaners are utilized in numerous situations ranging from relatively light duty, such as the removal of crumbs and dust from a flat surface, as well as for relatively heavy duty operation as in the withdrawal of foreign matter embedded in carpets and upholstery. It is apparent from the wide range of cleaning tasks that some cleaning is best accomplished by the use of air alone, while other cleaning is best accomplished with the use of water or other cleaning liquid which is to be drawn by suction into the vacuum cleaner.

It is recognized that the use of a liquid cleaning agent necessitates a more complex structure in the vacuum cleaner. Thus, it is necessary to protect a fan motor from contamination by the liquid. Provision must also be made for extraction of the foreign matter and the liquid cleaner from the vacuum cleaner upon completion of the cleaning process. In addition, the foregoing must be accomplished while allowing for the intake and exhaust of the air stream which is driven by suction of the cleaner fan.

The foregoing constraints become more difficult to attain in the case of a portable vacuum cleaner, since, as is readily appreciated, a hand held cleaner may be placed in a variety of positions and orientations so that, unlike a stationery cleaner, reliance cannot be made solely on the use of gravity for direction of the liquid cleaning agent away from the motor. Also, it is realized that the use of the traditional vacuum-cleaner bag fabricated of cloth or paper would be contraindicated since any liquid entrapped therein would tend to leak out upon removal of the bag.

Thus, a problem exists in that the desirable feature of portability in a vacuum cleaner is difficult to attain in a situation wherein the vacuum cleaner is to be used for both wet and dry cleaning applications.

SUMMARY OF THE INVENTION

The foregoing problem is overcome and other advantages are provided by a vacuum cleaner which employs an electrically driven blower wherein batteries are utilized to power the electric motor so that portable operation can be attained. In accordance with the invention, both the liquid cleaning agent and the dirt are drawn through the nozzle, in response to the vacuum, and are then deposited in a storage chamber. Both the chamber and the nozzle are formed in the unitary structure of a canister which is readily secured to and removed from a housing which contains the motor and the fan. Thereby, the liquid and the dirt can be readily disposed of by detaching the canister from the housing, and then simply pouring out the liquid and the dirt from the canister. The canister is fabricated, preferably, of a hard plastic material which may be washed so that the canister can be reused many times, thereby obviating the need for a cloth or paper bag.

A partial vacuum produced by the fan provides a suction passage through the nozzle into the chamber and then into the housing to the fan. At an interface between the canister and the housing, there is provided a structure for the deflection of the liquid away from an entry port of the housing while permitting the air to pass into the housing. In a first embodiment of the invention, the deflection structure comprises a flexible member at a posterior port of the nozzle, the flexible member closing the port except during the presence of suction forces when the member is flexed away from the posterior port so as to admit the fluids into the chamber. A filter is placed at the entrance to the housing to trap particulate matter and a hood covers the top of the filter and extends forward beneath the flexible member to aid in the deflection of the liquid and dirt towards the central portion of the storage chamber, and away from the entry port to the housing. Thereby, during use of the vacuum cleaner in a substantially horizontal position, substantially all of the liquid collects in the storage chamber.

In the event that the vacuum cleaner is oriented in a non-horizontal position, at an angle of inclination sufficient to bring a liquid up against the filter, then some liquid is drawn through the filter to the fan. However, behind the fan there is provided a baffle which protects the motor from the liquid, the housing being provided with vents forward of the baffle through which the air and any liquid contained therein is exhausted to the exterior of the vacuum cleaner. Thereby, the motor is protected from the liquid in the event of an excessive inclination of the vacuum cleaner.

In a second embodiment of the invention, the deflection structure is formed by means of a deflector positioned at the posterior port of the nozzle and an enclosed inlet chamber disposed in front of the filter and an air conduit of the fan housing. The inlet chamber has an opening disposed near the top of the storage chamber so as to prevent the flow of liquid into the air conduit. The diverter directs liquid towards the bottom of the storage chamber and away from the opening of the inlet chamber to the conduit so as to inhibit the passage of any liquid with the dirt entrained therein into the blower.

BRIEF DESCRIPTION OF THE DRAWING

The foregoing aspects and other features of the invention are explained in the following description taken in connection with the accompanying drawings wherein.

DETAILED DESCRIPTION OF THE DRAWING

Figure 1:
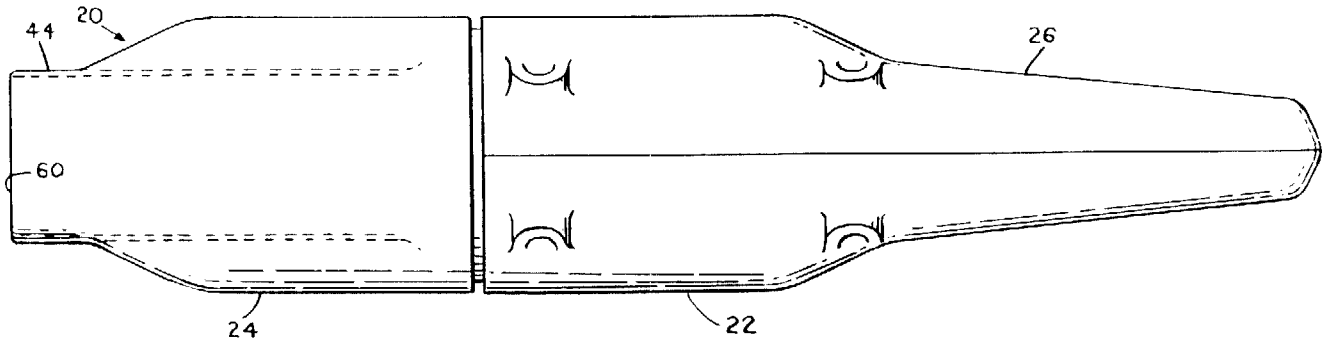
FIG. 1 is a top plan view of the vacuum cleaner of the invention.
Figure 2:
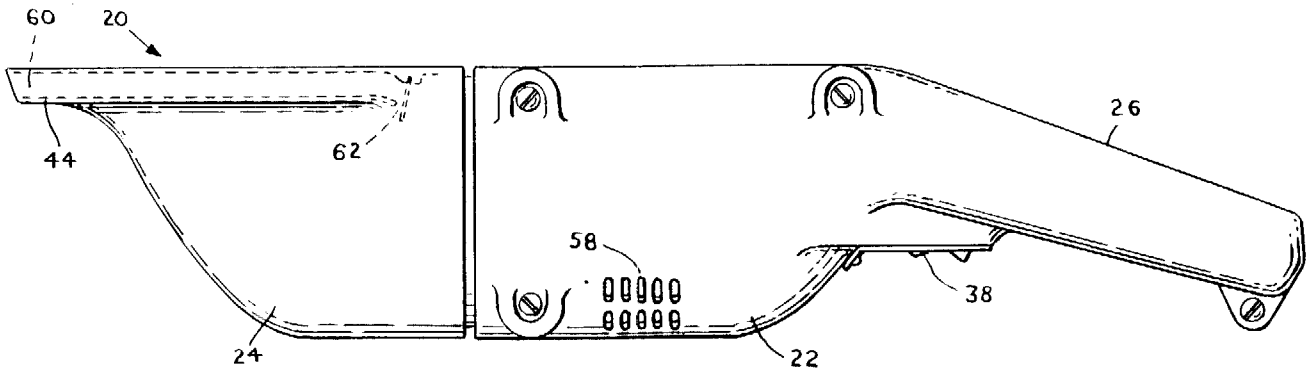
FIG. 2 is a side elevation view of the vacuum cleaner.
Figure 4:
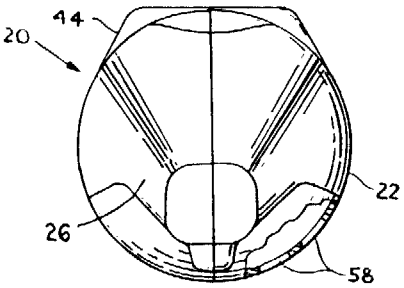
FIG. 4 is a back end view of the vacuum cleaner.
Figure 3:
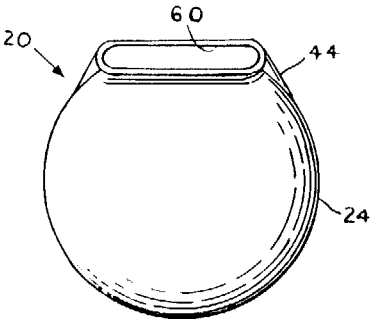
FIG. 3 is a front end view of the vacuum cleaner.
Figure 5:
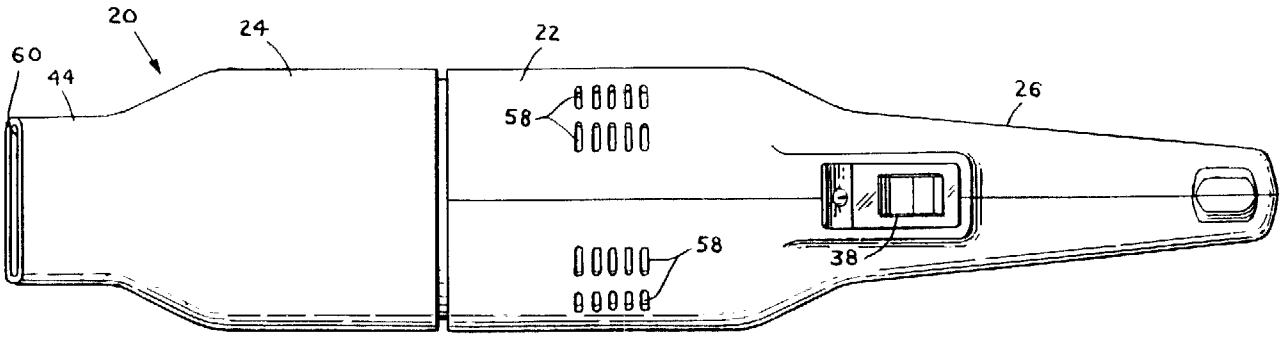
FIG. 5 is a bottom view of the vacuum cleaner.
Figure 6:
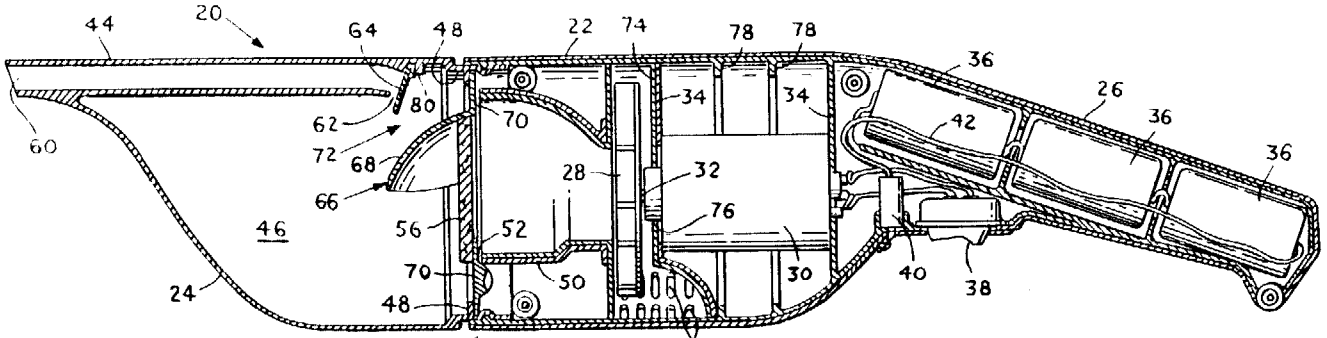
FIG. 6 is a sectional view of the vacuum cleaner taken along a longitudinal axial plane.
Figure 9:
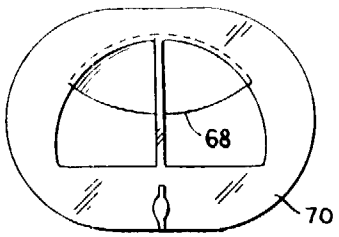
FIGS. 7, 8 and 9 are, respectively, a front view, a sectional view, and a back view of a hood assembly disclosed in FIG. 6, the view in FIG. 8 being near along a central axial plane.
Figure 8:
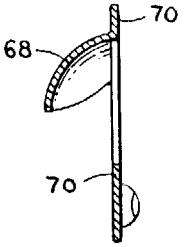
Figure 7:
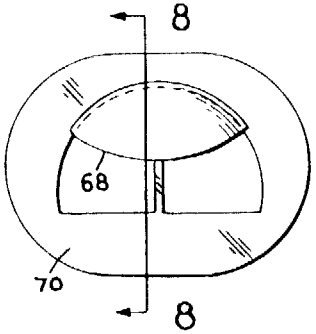
Figure 10:
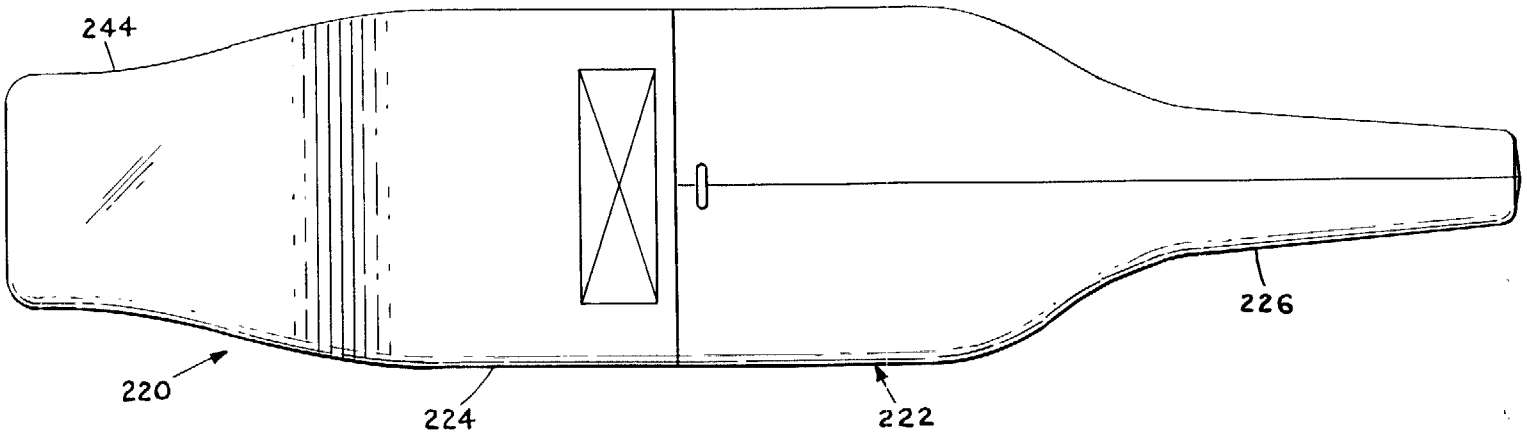
FIG. 10 is a top plan view of the vacuum cleaner in accordance with an alternative embodiment of the invention.

With reference to the FIGS. 1-9, there is shown a vacuum cleaner 20 incorporating the invention. The cleaner 20 comprises a central housing 22 having a canister 24 affixed to a front end thereof and a handle 26 extending from the back end thereof. The handle 26 is configured to be held in the hand of a person using the cleaner 20 for the cleaning of upholstery, rugs, as well as in the dusting of flat surfaces such as the top of a table.

The housing 22 contains a blower 28 which may also be referred to as a fan or impeller, and an electric motor 30 coupled by a shaft 32 to the blower 28. Rotation of the shaft 32 by the motor 30 imparts rotation to the blower 28 to create a partial vacuum and the accompanying suction which draws air through the canister 24 into the housing 22. The motor 30 is supported within the housing 22 by ribs 34 which are disposed circumferentially around the motor 30 and contact the interior surface of the housing 22. The motor 30 is powered by batteries 36. A switch 38 is positioned on the underside of the handle 26 for convenient engagement by means of the finger of a person utilizing the cleaner 20. Operation of the switch 38 provides for the coupling of electric power from the batteries 36 to the motor 30 for activation of the motor 30. A battery charger 40 may also be positioned within the handle 26 for recharging the batteries 36 during a period of nonuse of the cleaner 20, the charger being connected by a suitable electric cord (not shown) to an electrical convenience power outlet in the home or other location wherein the cleaner is to be used. Electric wiring 42 connects the batteries 36 by the switch 38 to the motor 30 and also connects the charger 40 to the batteries 36.

In accordance with a feature of the invention, the canister 24 incorporates a nozzle 44 and a storage chamber 46 disposed beneath the nozzle 44. The chamber 46 will be used for the collection of any liquid cleaning agents which may be drawn in by suction into the cleaner 20. The canister 24 is removably attached by a spring-clip assembly 48 to the forward end of the housing 22. Alternatively, the canister 24 can be made of a flexible plastic configured to spring-lock the canister into its operative position.

Within the housing 22, a conduit 50 having an entry port 52 conducts air under suction from the canister 24 to the blower 28. The entry port 52 is located at the region of an interface 54 between the housing 22 and the canister 24. An air filter 56 is located at the entry port 52 for the entrapment of particulate matter which may otherwise be drawn into the housing 22 by the passage of air towards the blower 28. Air drawn in by the blower 28 passes through the blower 28 and is then exhausted from the housing 22 via exhaust vents 58 disposed in the circumferential surface of the housing 22 and, more particularly, at the bottom portion of the housing 22 to permit the escape of any liquid which may have been drawn by the air stream through the filter 56 and the blower 28. Thus, in response to the suction generated by the blower 28, air enters the nozzle 44 at an anterior port 60 thereof, exits the nozzle 44 via a posterior port 62 thereof to enter the chamber 46, after which the air passes via the filter 56 into the conduit 50 and vents by the blower 28 to exhaust via the vents 58.

In accordance with the invention, the cleaner 20 includes a flapper valve 64 and a hood assembly 66, the latter including a hood 68 extending from a partition 70 downwardly over the upper portion of the filter 56. The flapper valve 64 and the hood 68 in cooperation with the positioning of the chamber 46 beneath the posterior port 62 constitute a deflection structure, indicated generally by the numeral 72, for deflecting liquid into the chamber 46 and away from the entry port 52 so as to acocmplish a separation of the liquid from the air as both are drawn into the cleaner via the nozzle 44 under the force of the suction developed by the blower 28.

In operation, air, or both air and liquid may be drawn into the cleaner 20 depending on whether the cleaner 20 is used for dry operation or wet operation. While the cleaner 20 operates well in both situations, the invention is particularly useful in the case of the utilization of liquid cleaning agents, such as water or other solvents, along with the air which carries the liquid and dirt via the nozzle 44 into the chamber 46. By virtue of the deflection structure 72, the flapper valve 64 and the hood 68 direct liquid falling from the posterior port 62 upon the hood 68 towards the central portion of the chamber 46 and away from the entry port 52 of the conduit 50. Thus, with the cleaner 20 held in a substantially horizontal position, or in a position wherein the canister 24 is pointing in a generally downward direction, liquid accumulates in the chamber 46 and rises against the lower portion of the partition 70 up to the bottom of the entry port 52. At this point, the chamber 46 should be regarded as sufficiently full to require emptying of the liquid before further cleaning is attempted. Accordingly, the canister 24 would then be detached from the housing 22 by means of the clip assembly 48 whereupon the stored liquid would be poured out of the canister 24.

In the event that the cleaning were continued without emptying of the canister 24, or in the event that the cleaner 20 were tipped upwards so that the canister 24 is raised above the housing 22, then some flow of liquid through the filter 56 would commence, the liquid then being drawn via the air stream along the conduit 50 and into the blades of the blower 28. However, even under this circumstance, the motor 30 is protected from the liquid by a baffle plate 74 in the exhaust vents 58. The baffle plate 74 extends across the housing 22 and engages with the outer surface of the front bearing 76 of the motor 30 for blocking the flow of liquid towards the motor 30 and directing such flow of liquid to the exhaust vents 58 at the bottom of the housing 22. Thereby, any liquid which fails to be caught within the chamber 46 exits the housing 22 via the vents 58.

In the manner of construction of the cleaner 20, the housing 22 has a generally cylindrical shape and includes ribs 78 for providing increased rigidity to the housing 22. The flapper valve 64 is formed of a flexible member, such as a membrane, which is anchored at its upper edge in a bossed extending inwardly from the wall of the nozzle 44. The hood 68 may be formed of metal or plastic, plastic being preferred for its resistance to corrosion. The hood 68 extends into the chamber 46 from the partition 70 so as to provide a suitable flow path for liquid entrained in the air stream. The force of the vacuum is sufficient to deflect the flexible member of the valve 64 so as to open the posterior port 62 for passage of the fluids.

In view of the accumulation of liquid and dirt, or dirt alone in the event that the cleaner 20 is utilized in the dry mode, within the storage chamber 46, and in view of the fact that the chamber 46 can be readily emptied and washed out, there is no need for the use of a fabric or paper bag for the entrapment of dirt as is frequently utilized in cleaning apparatus. Thus, the cleaner 20 can be utilized without the use of such bag, as is portrayed in FIG. 6.

With reference to FIGS. 10–29 there is shown an alternative embodiment of the vacuum cleaner, the vacuum cleaner 220 of the alternative embodiment incorporating a further feature of the invention relating to the structure for deflecting the liquid away from the stream of air which passes on into the blower. The description of the cleaner 220 closely parallels that of the cleaner 20, presented above, and, to the extent possible, corresponding structural features are correspondingly numbered with the 200 series identifying the component of the alternative embodiment.

The cleaner 220 comprises a central housing 222 having a canister 224 affixed to a front end thereof and a handle 226 extending from the back end thereof.

The housing 222 contains a blower 228 which may also be referred to as a fan or impeller and an electric motor 230 coupled by a shaft 232 to the blower 228. Rotation of the shaft 232 by the motor 230 imparts rotation to the blower 228 to create a partial vacuum and accompanying suction which draws air through the canister 224 into the housing 222. The motor 230 is supported within the housing 222 by ribs 234–235 which are disposed circumferentially around the motor 230 and contact the interior surface of the housing 222. The motor 230 is powered by batteries 236. A switch 238 is positioned on the underside of the handle 226 for convenient engagement by means of the finger of a person utilizing the cleaner 220. Operation of the switch 238 provides for the coupling of electric power from the batteries 236 to the motor 230 for activation of the motor 230. A battery charger 240 may also be positioned within the handle 226 for recharging the batteries 236 during a period of nonuse of the cleaner 220, the charger being connected by a suitable cord (not shown) to an electrical convenient power outlet. Electric wiring (not shown) connects the batteries 236 by the switch 238 to the motor 230 and also connects the charger 240 to the batteries 236.

In accordance with a feature of the invention, the canister 224 incorporates a nozzle 244 and a storage chamber 246 disposed beneath the nozzle 244. The chamber 246 is used for the collection of any liquid cleaning agents which may be drawn in by suction into the cleaner 220. The canister 224 is shown as being removably attached by means of a spring-lock configuration 248 molded into the forward end of the canister 224.

Within the housing 222, a conduit 250 having an entry port 252 inducts air under suction from the canister 224 to the blower 228. The entry port 252 is located at the region of an interface between the housing 222 and the canister 224. An air filter 256 is located at the entry port 252 for entrapment of particulate matter which may otherwise be drawn into the conduit 250 by the passage of air toward the blower 228. Air drawn in by the blower 228 passes through the blower 228 and is then exhausted from the housing 222 via exhaust vent 258 disposed in the circumferential surface of the housing 222 and, more particularly, at the bottom portion of the housing 222 to permit the escape of any liquid which may have been drawn by the air stream through the filter 256 and the blower 258. Thus, in response to the suction generated by the blower 228, air enters the nozzle 244 via a passage 260 thereof, and thereafter flows through the passage 260 into the chamber 246.

In accordance with the invention, the nozzle 244 is provided with a diverter 262 disposed at an exit port 264 at the posterior end of the passage 260. The conduit 250 is provided with an inlet chamber 266 bounded by a front wall which forms an air-entry port 268 having an opening which is offset from the central axis of the housing 222. The opening of the port 268 is located near the top of the storage chamber 246 to prevent the flow of liquid stored in the chamber 246 from flowing into the conduit 250. The diverter 266 diverts incoming liquid down towards the bottom of the chamber 246 and away from the opening of the port 268. Thereby, incoming liquid with dirt entrained therein is deflected away from the flow of the air stream, which air flows from the passage 260 via the chamber 246 into the port 268. The conduit 250 is supported by a partition 270 at the front end thereof, and by a partition 271 at the back end thereof to the housing 222. The air-entry port 268 in cooperation with the deflector 262 constitutes a deflection structure, indicated generally by the numeral 272, to accomplish the foregoing deflection of the liquid into the chamber 246 away from the air conduit 250. The deflection structure 272 separates the liquid from the air, the liquid remaining in the chamber 246 while the air passes under the force of suction into the region of the blower 228.

In operation, air, or both air and liquid may be drawn into the cleaner 220 depending on whether the cleaner 220 is used for dry operation or wet operation. While the cleaner 220 operates well in both situations, the invention is particularly useful in the case of the utilization of liquid cleaning agents, such as water or other solvents, along with the air which carries the liquid and dirt via the nozzle 244 into the chamber 246. By virtue of the deflection structure 272, the deflector 262 directs all matter entering the passage 260 downwards towards the bottom of the storage chamber 246. Liquid and any dirt entrained therein remains at the lower portion of the storage container 246 while the air under suction proceeds through a sinuous path back up to the opening of the inlet chamber 266 for further passage into the air conduit 250. When the cleaner 220 is used for dry operation only, any particulate matter which may be carried in by the air stream is caught within the canister 224. Relatively heavy particles which may have been lifted off a surface being cleaned by the air rushing into the nozzle 244 may drop out of the air stream under conditions of turbulence within the chamber 246 and be deposited on the bottom of the chamber 246. Lighter particles carried in by the air stream advance through the chamber 246 and the entry port 268 to impinge upon the filter 256. Such particles are entrained within the filter 256 while the air advances to the blower 228 for subsequent exit via the vents 258.

When the cleaner 220 is held in a substantially horizontal position, or in a position wherein the canister 224 is pointing in a generally downward direction, the liquid accumulates in the chamber 246 and rises against the lower portion of the front wall of the inlet chamber 266. At this point, the chamber 246 should be regarded as sufficiently full to require emptying of the liquid before further cleaning is attempted. The canister 224 with the entry port are detached from the housing 222 to permit emptying of the contents thereof. Thereby, the filter 256 is exposed for removal and cleaning. It is also noted that dirt entrained by the filter 256 may fall to the bottom of the inlet chamber 266 so as to collect therein just as the liquid collects in the bottom of the storage chamber 246. Thereby, the canister 224 has accumulated both the liquid from a wet cleaning operation and dust from a dry cleaning operation.

Figure 11:
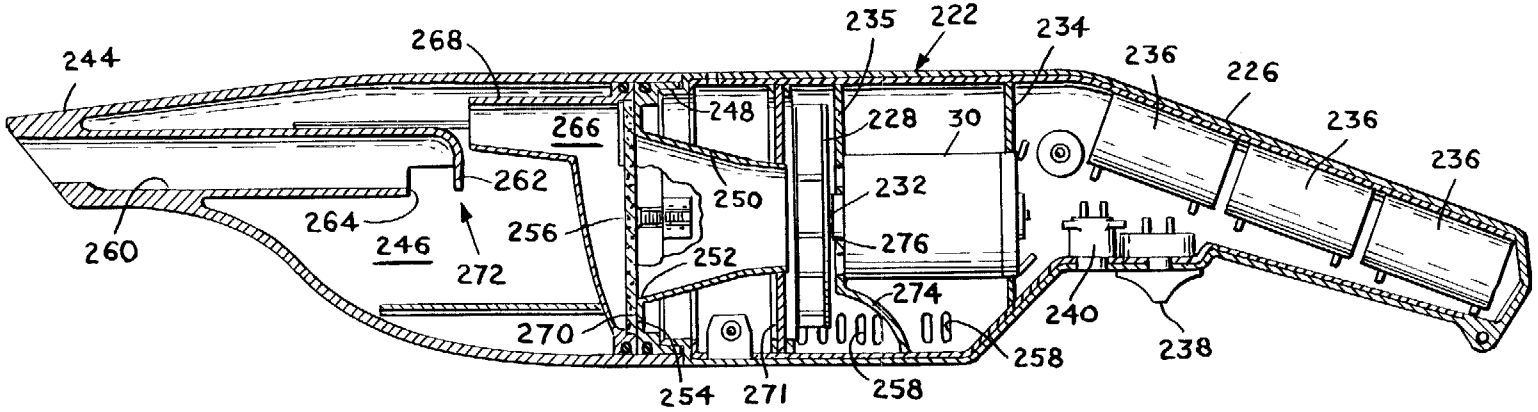
FIG. 11 is a vertical sectional view of the alternative embodiment of the vacuum cleaner of FIG. 10.

In the event that the cleaner 220 were tipped upwards so that the liquid stored in the chamber 246 would flow towards the rear of the chamber, the forward protrusion of the cone shaped portion of the entry port 268 would prevent the ingress of liquid into the inlet chamber 266. Even in the event that the chamber 246 became overloaded with liquid, in which case some liquid may find its way through the opening of the entry port 268 into the conduit 250, the motor 230 is protected from the liquid by a baffle 274 formed in the base portion of the front rib 235, the baffle 274 extending rearwardly beneath the motor 230 to uncover vents 258 which would allow the excess liquid to be forced out with the exhaust air from the blower 228. In addition, it is noted that the supporting of the conduit 250 by front partition 270 and rear partition 271 maintains the conduit 250 positioned along the axis of the housing 22. The conical shape of the conduit 250 with the attendant sloping bottom wall (as depicted in FIG. 11) providing still further space for the capture of excess liquid for protection of the motor 230.

Figure 12:
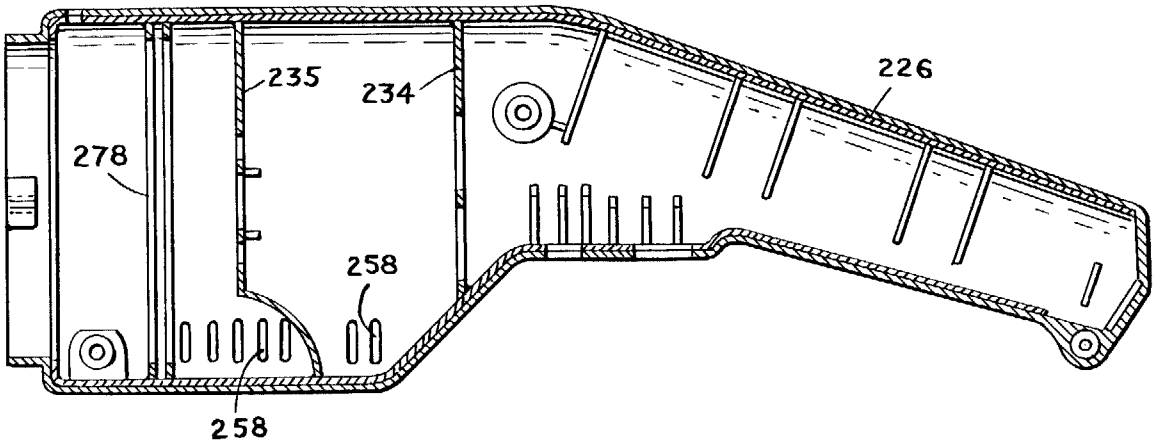
FIGS. 12 and 13 are fragmentary sectional views of components of the housing disclosed in FIG. 11.
Figure 14:
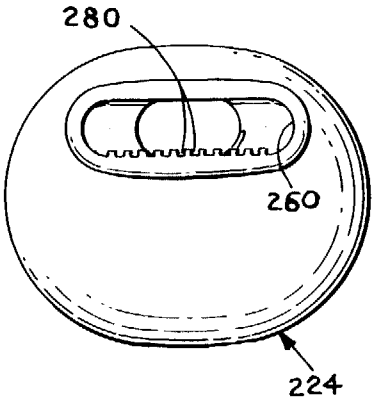
FIG. 14 is a front view of the embodiment of FIG. 10.
Figure 13:
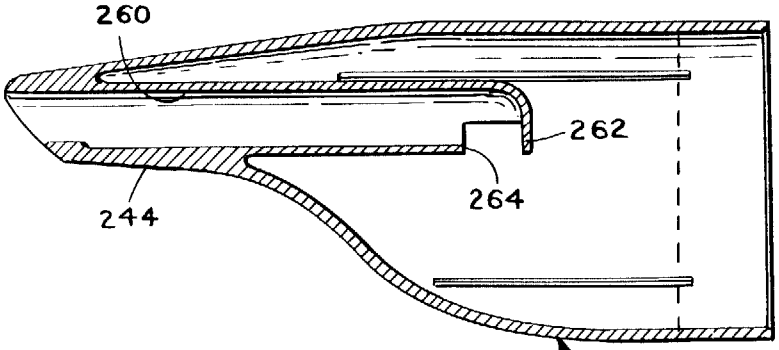
Figure 15:
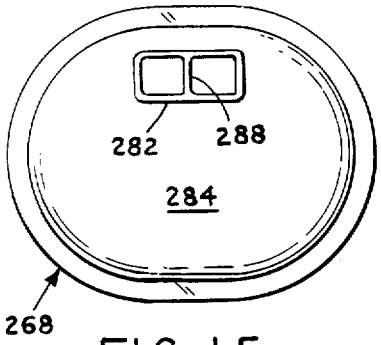
FIG. 15 is a front view of the opening to the inlet chamber to the air conduit of FIG. 11.
Figure 16:
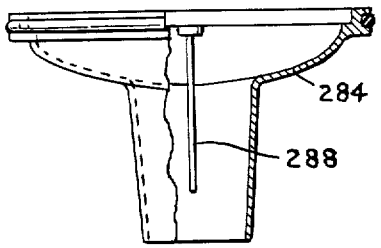
FIG. 16 is a horizontal sectional view of the inlet chamber of FIG. 15.
Figure 17:
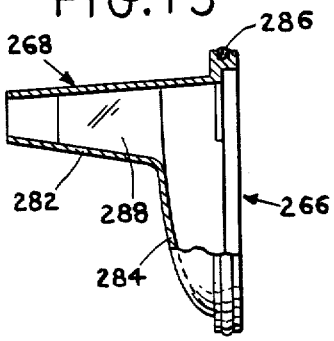
FIG. 17 is a vertical sectional view of the inlet chamber of FiG. 15.
Figure 18:
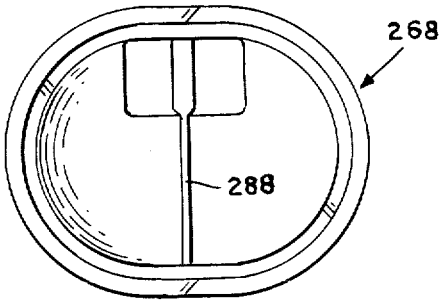
FIG. 18 is a rear view of the inlet chamber of FIG. 15.
Figure 19:
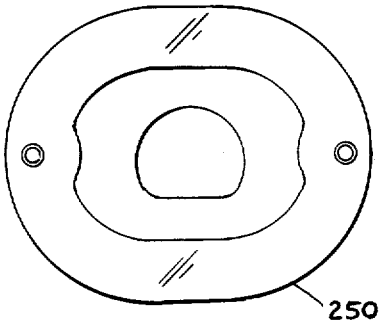
FIG. 19 is a front elevation view of an air conduit leading air to the blower of FIG. 11.
Figure 20:
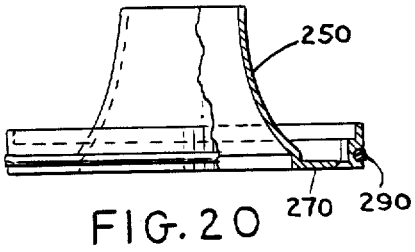
FIG. 20 is a plan view, partially sectioned, of the air conduit of FIG. 19.
Figure 21:
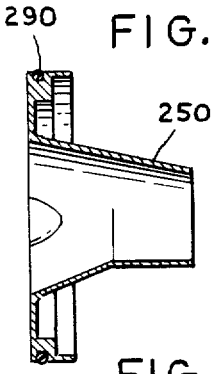
FIG. 21 is a vertical sectional view of the air conduit of FIG. 19.
Figure 22:
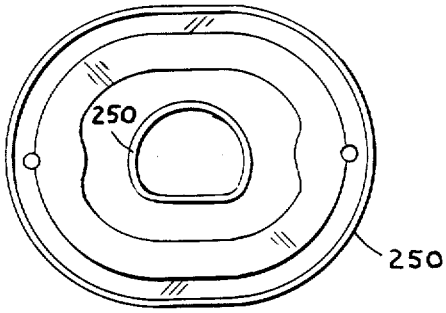
FIG. 22 is a rear view of the air conduit of FIG. 19.

With respect to further details in the construction of the cleaner 220, the housing 222 is advantageously strengthened by the use of ribs 278 (FIG. 12). The front end of the nozzle 244 is advantageously provided with serrations 280 (FIG. 14) which provide for a scraping or combing function of the nozzle 244 which aids in the cleaning of fabrics. As depicted in FIGS. 15–18, the offset entry port 268 is formed with a snout 282 integrally formed on the upper portion of the front wall 284 of the inlet chamber 266. A bead 286 is disposed along the rim of the chamber 266 to faciliate assembly and disassembly of the canister 224. A vane 288 guides air in laminar flow through the port 268. The conduit 250 (FIGS. 19–22) is also provided with a bead 290 along an outer rim of the front partition 270 to aid in assembling and disassembling of the conduit 250 with the housing 222. If desired, a portion of the conic wall of the conduit 250 may be configured with different slopes to aid further in containing the liquid forward of the blower 228.

Figure 23:
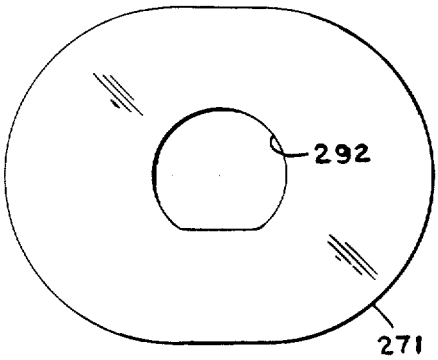
FIGS. 23 and 24 are, respectively, a front view and a side sectional view member for holding the rear of the air conduit of FIG. 11.
Figure 24:
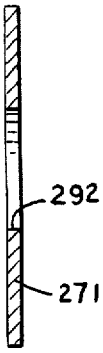
Figure 25:
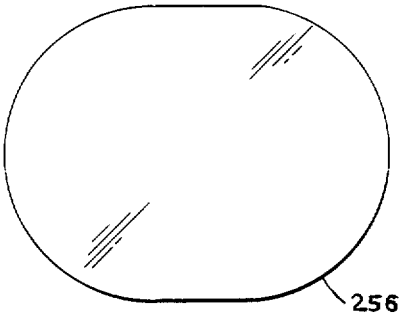
FIGS. 25 and 26 are, respectively, a front view and a side sectional view of an air filter of FIG. 11.
Figure 26:
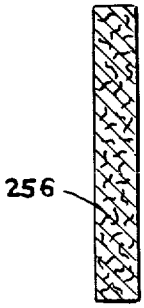
Figure 27:
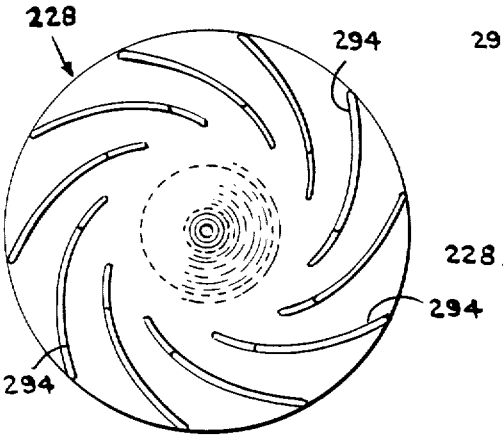
FIGS. 27, 28 and 29 are, respectively, a front view, a side sectional view and a side elevation view of the blower of FIG. 11.
Figure 28:
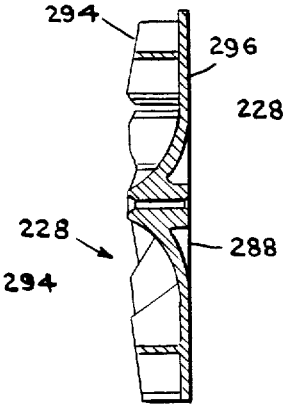
Figure 29:
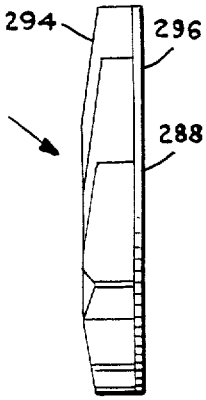

With reference to FIGS. 23–24, the rear partition 271 is configured with a relatively small central aperture 292 for engagement with the downstream end of the conduit 250. The filter 256 (FIGS. 25–26) is provided with a generally flat shape, a uniform thickness, and a generally rounded periphery so as to be readily inserted along the interface 254 between the canister 224 and the housing 222. The blower 228 (FIGS. 27–29) comprises a set of spiral vanes 294 mounted on a base plate 296 which provides strength to the blower 228, the overall configuration of the blower 228 having a shape which is readily molded.

In view of the foregoing description of the alternative embodiment of the cleaner, it is readily apparent that the alternative embodiment provides for still further resistance to any leakage of liquid from the canister into the motor compartment of the cleaner. In addition, all of the components are readily fabricated and securely mounted for long life.

It is to be understood that the above described embodiments of the invention are illustrative only and that modifications thereof may occur to those skilled in the art. Accordingly, this invention is not to be regarded as limited to the embodiments disclosed herein, but is to be limited only as defined by the appended claims.

I claim:

1. A vacuum cleaner comprising:

a motor;

a generally cylindrical housing having a front end and a back end, said housing enclosing said motor;

a blower driven by said motor and disposed ahead of said motor within said housing, rotation of said blower producing a vacuum;

a cahister removably attached to the front end of said housing, said canister having an intake nozzle for reception of dirt, liquid, and air drawn into said nozzle in response to a vacuum developed by said blower;

said canister including a storage chamber disposed alongside an exit port of said nozzle for the storage of the dirt and the liquid drawn in via said nozzle; and deflection means disposed between said blower and said nozzle for deflecting liquid and dirt drawn in via said nozzle away from a stream of air which flows from said nozzle to said blower, said deflection means comprising:

an air conduit disposed ahead of said blower and guiding the air stream from said canister to said blower, said conduit incorporating an inlet chamber facing said storage chamber and having an entry port for receiving air from said canister, said entry port being offset from the location of said storage chamber so as to be above said storage chamber and inhibit the passage of any of the liquid from said storage chamber into said conduit when said vacuum cleaner is oriented with a horizontal orientation placing said storage chamber beneath said nozzle; and a diverter positioned at said exit port of said nozzle and directing suctioned liquid away from said entry port of said conduit, said entry port of said conduit being provided with a front wall and a snout extending forward of said front wall into said storage chamber, said snout preventing the entry of the liquid into said inlet chamber when said cleaner is oriented with said horizontal orientation.

2. A cleaner according to claim 1 further comprising a filter disposed along the rear of said inlet chamber, said filter entraining particulate matter carried by said airstream.

3. A cleaner according to claim 2 wherein said housing includes vents, alongside said motor, for exhausting air driven by said blower along with any dirt and liquid which, under suction of the vacuum, may have passed from said canister via said filter to said housing.

4. A cleaner according to claim 2 wherein said air conduit has a generally conical shape with a smaller diameter opening towards the rear of said housing, thereby to guide air to a central portion of said blower while providing further space for the catching of any liquid which might have passed through said filter.

5. A cleaner according to claim 4 wherein said housing includes vents disposed behind and to the side of an exit port of said air conduit to provide an escape path for any liquid which may have entered said conduit.

6. A cleaner according to claim 5 wherein said housing includes a transverse rib for supporting a front end of said motor, there being a baffle extending from an end of said rib to a site behind said vents for guiding liquid away from said motor and out through said vents.

7. In a vacuum cleaner operative with a source of suction, the improvement comprising:

a housing supporting the source of suction, said housing having an intake portion, *a front end and a back end,* and further comprising exhaust vents through which air, drawn in by the suction, is exhausted to the exterior of the housing;

a canister removably securable to said [intake portion] *front end* of said housing, said canister including a nozzle having an anterior port through which air is drawn into the nozzle and a posterior port through which air exits the nozzle, said canister further including a storage chamber positioned [alongside] *adjacent* said posterior port of said nozzle for reception of fluids including air and liquid [cleaning agents] which may be drawn in by the suction; [and]

deflection means [situated at an interface between said canister and said housing] for deflecting the liquid into said storage chamber away from said intake portion of said housing while permitting the flow of air under suction through said intake portion into said housing; [said deflection means further comprising:]

an air conduit disposed [behind said intake portion of said housing and ] *upstream of said source of suction for* guiding a stream of air from said canister to the source of suction, said conduit [incorporating] *communicating with* an inlet chamber [facing] *adjacent* said storage chamber and having an entry port *with an opening* for receiving air from said canister, said *opening of said* entry port [of said conduit] being offset from the location of said storage chamber so as to be above said storage chamber and inhibit the passage of any liquid from said storage chamber into said conduit when said vacuum cleaner is oriented with a horizontal orientation; and

[a diverter] *said deflection means* positioned [at] *adjacent* said posterior port of said nozzle and directing suctioned liquid away from *said opening of* said entry port [of said conduit], said inlet chamber being provided with a front wall facing said storage chamber, said entry port [being formed as a snout] *comprising a protrusion* extending from said [forward] *front* wall of said inlet chamber [to a location offset from said posterior port of said nozzle] *into said storage chamber* to inhibit the passage of any liquid stored in said storage chamber from passing via said conduit toward the source of suction when said cleaner is oriented with said [horizontal orientation] *nozzle positioned higher than said source of suction.*

*8. A vacuum cleaner comprising:*

*a housing having a front end and a back end,*

*a motor positioned in said housing,*

*a blower driven by said motor and disposed within said housing, rotation of said blower producing a vacuum,*

*a canister removably attached to said front end of said housing, said canister having an intake nozzle for reception of dirt, liquid and air drawn into said nozzle in response to a vacuum developed by said blower,*

*said canister including a chamber for storage of the dirt and liquid drawn in through said nozzle,*

*air conduit means disposed upstream of said blower and guiding the air stream from said canister to said blower, said air conduit means communicating with an entry port for receiving air from said canister,*

*said entry port comprising a protrusion extending from said air conduit means into said canister to an opening in the protrusion offset from the location of said chamber so as to be above said chamber and inhibit the passage of any of the liquid from said chamber into said air conduit means when said vacuum cleaner is oriented with a horizontal orientation placing said chamber beneath said nozzle, and*

*deflection means in said canister positioned adjacent said nozzle for separating liquid and dirt drawn in through said nozzle away from said air stream and directing said liquid and dirt into said chamber while permitting air flow into said opening of said entry port communicating with said air conduit means.*

*9. A vacuum cleaner according to claim 8 further comprising a filter disposed in said air conduit means for entraining particulate matter carried by said air stream.*

*10. A vacuum cleaner comprising;*

*a motor;*

*a housing having a front end and a back end, said housing enclosing said motor;*

*a blower driven by said motor and disposed ahead of said motor within said housing, rotation of said blower producing a vacuum;*

*a canister removably attached directly to the front end of said housing, said canister having an intake nozzle for reception of dirt, liquid and air drawn into said nozzle in response to a vacuum developed by said blower;*

*said canister including a storage chamber disposed adjacent an exit port of said nozzle for the storage of the dirt and the liquid drawn in via said nozzle; and*

*deflection means disposed between said blower and said nozzle for deflecting liquid and dirt drawn in via said nozzle away from a stream of air which flows from said nozzle to said blower, said deflection means comprising:*

*an air conduit disposed ahead of said blower and guiding the air stream from said canister to said blower, said*

*conduit having entry means with an opening for receiving air from said canister, said opening being offset from the location of said storage chamber so as to be above said storage chamber and inhibit the passage of any of the liquid from said storage chamber into said conduit when said vacuum cleaner is oriented with a horizontal orientation placing said storage chamber beneath said nozzle; and*

*a diverter positioned at said exit port of said nozzle and directing suctioned liquid away from said opening of said entry means, said entry means having a protrusion extending into said storage chamber, said protrusion preventing the entry of the liquid into said air conduit when said cleaner is oriented with said nozzle positioned above said air conduit.*

*11. A hand-held, portable vacuum cleaner for picking up both wet and dry substances and capable of being used and transported in a variety of orientations, the vacuum cleaner comprising:*

*a housing having a front end and a back end, a substance collection chamber removably attached to the front end of the housing, and a compartment in the housing containing a source of suction, said collection chamber including an intake nozzle for reception of particulate solids, liquid and air drawn into said nozzle by said source of suction; and*

*deflection means positioned upstream of said source of suction and including an opening communicating with the collection chamber for receipt of air being drawn from said nozzle toward said source of suction, diverter means for separating particulate solids and the liquid from the air and directing the particulate solids and the liquid into said collection chamber away from said opening, and means carrying said opening configured such that liquid in said collection chamber will not enter said opening when the cleaner is tilted away from a normal operating orientation such that said nozzle is higher than said source of suction.*

*12. The cleaner of claim 11 wherein said means carrying said opening comprises a protrusion extending from a wall of the collection chamber, said wall separating the collection chamber from said compartment holding said source of suction.*

*13. A hand-held, portable vacuum cleaner capable of picking up both dirt and liquids and capable of being used, transported and stored in a variety of positions, the vacuum cleaner comprising:*

*a motor;*

*a housing having a front end and a back end, the housing enclosing the motor;*

*a blower driven by the motor and disposed ahead of the motor within the housing, rotation of the blower producing a vacuum;*

*a canister removably attached directly to the front end of the housing such that the canister and housing are maneuverable as a unit, the canister having an intake nozzle for reception of dirt, liquid and air drawn into the nozzle in response to a vacuum developed by the blower;*

*the canister including a storage chamber disposed adjacent an exit port of the nozzle for storage of the dirt and the liquid drawn in via the nozzle; and*

*deflection means disposed between the blower and the nozzle for deflecting liquid and dirt drawn in via the nozzle away from a stream of air flowing from the nozzle to the blower, the deflector means including:*

*an opening for receipt of the stream of air from the storage chamber, a diverter positioned at the exit port of the nozzle and directing suctioned liquid away from the opening, and a protrusion carrying the opening and extending into the storage chamber, the protrusion preventing entry of liquid into the opening when the vacuum cleaner is oriented with the nozzle higher than the blower.*

* * * * *